US010967997B2

(12) United States Patent
May et al.

(10) Patent No.: US 10,967,997 B2
(45) Date of Patent: Apr. 6, 2021

(54) CUTTING DEVICES FOR PACKAGING SYSTEMS WITH CLIPPERS AND RELATED CLIPPER ASSEMBLIES

(71) Applicant: Tipper Tie, Inc., Apex, NC (US)

(72) Inventors: Dennis J. May, Pittsboro, NC (US); Matthew D. Lowder, Durham, NC (US); Andrew Hart, Raleigh, NC (US)

(73) Assignee: TIPPER TIE, INC., Apex, NC (US)

( * ) Notice: Subject to any disclaimer, the term of this patent is extended or adjusted under 35 U.S.C. 154(b) by 967 days.

(21) Appl. No.: 15/233,299

(22) Filed: Aug. 10, 2016

(65) Prior Publication Data

US 2017/0057672 A1 Mar. 2, 2017

Related U.S. Application Data

(60) Provisional application No. 62/212,193, filed on Aug. 31, 2015.

(51) Int. Cl.
| | |
|---|---|
| B65B 5/00 | (2006.01) |
| B65B 9/20 | (2012.01) |
| B65B 61/06 | (2006.01) |
| A22C 11/00 | (2006.01) |
| B65B 51/04 | (2006.01) |

(52) U.S. Cl.
CPC .............. *B65B 9/20* (2013.01); *A22C 11/006* (2013.01); *B65B 61/06* (2013.01); *B65B 51/04* (2013.01)

(58) Field of Classification Search
CPC .............................. A22C 11/125; B65B 51/04
USPC ........................................................... 83/519
See application file for complete search history.

(56) References Cited

U.S. PATENT DOCUMENTS

| | | | | |
|---|---|---|---|---|
| 3,783,583 | A | * 1/1974 | Dobbert | .................. B65B 51/00 53/138.4 |
| 4,001,926 | A | * 1/1977 | Velarde | .................. B65B 51/04 29/243.56 |
| 4,004,339 | A | * 1/1977 | Velarde | .................. B65B 51/04 29/243.56 |
| 4,821,485 | A | 4/1989 | Evans et al. | |
| 5,020,298 | A | 6/1991 | Evans et al. | |
| 5,259,168 | A | 11/1993 | Evans et al. | |

(Continued)

FOREIGN PATENT DOCUMENTS

CN 202688226 U 1/2013

*Primary Examiner* — Andrew M Tecco
*Assistant Examiner* — Eyamindae C Jallow
(74) *Attorney, Agent, or Firm* — Christensen O'Connor Johnson Kindness PLLC

(57) ABSTRACT

Clipper assemblies include a clipper body with a die support holding at least one clip die; and a knife cylinder with a downwardly extending rod, the knife cylinder attached to the clipper body above the clip die. The clipper assemblies also include a knife plate having a body with a perimeter with a first portion pivotably attached to the rod and a second portion pivotably attached to the clipper body below the clip die. The knife plate holds a knife which extends outward from a side of the knife plate a distance between about 1-2 inches, at an angle of between 80-110 degrees (measured from a line drawn parallel to the side from which the knife extends outward from). In operation, the knife is configured to either: (a) move upward to cut respective clipped packages or (b) move downward to cut respective clipped packages.

29 Claims, 13 Drawing Sheets

(56) References Cited

U.S. PATENT DOCUMENTS

| | | | | |
|---|---|---|---|---|
| 5,269,054 | A * | 12/1993 | Poteat | B65B 51/04 |
| | | | | 29/243.56 |
| 5,405,288 | A * | 4/1995 | Stanley | A22C 11/125 |
| | | | | 29/243.56 |
| 5,471,815 | A | 12/1995 | Evans et al. | |
| 5,495,701 | A | 3/1996 | Poteat et al. | |
| 5,586,424 | A | 12/1996 | Chen et al. | |
| 5,644,896 | A | 7/1997 | Evans et al. | |
| 6,871,474 | B2 * | 3/2005 | Topfer | B65B 51/04 |
| | | | | 53/138.4 |
| 6,920,738 | B2 | 7/2005 | Wilkins et al. | |
| 8,006,463 | B2 * | 8/2011 | May | A22C 11/125 |
| | | | | 53/138.4 |
| 2015/0128524 | A1 | 5/2015 | Chen et al. | |

* cited by examiner

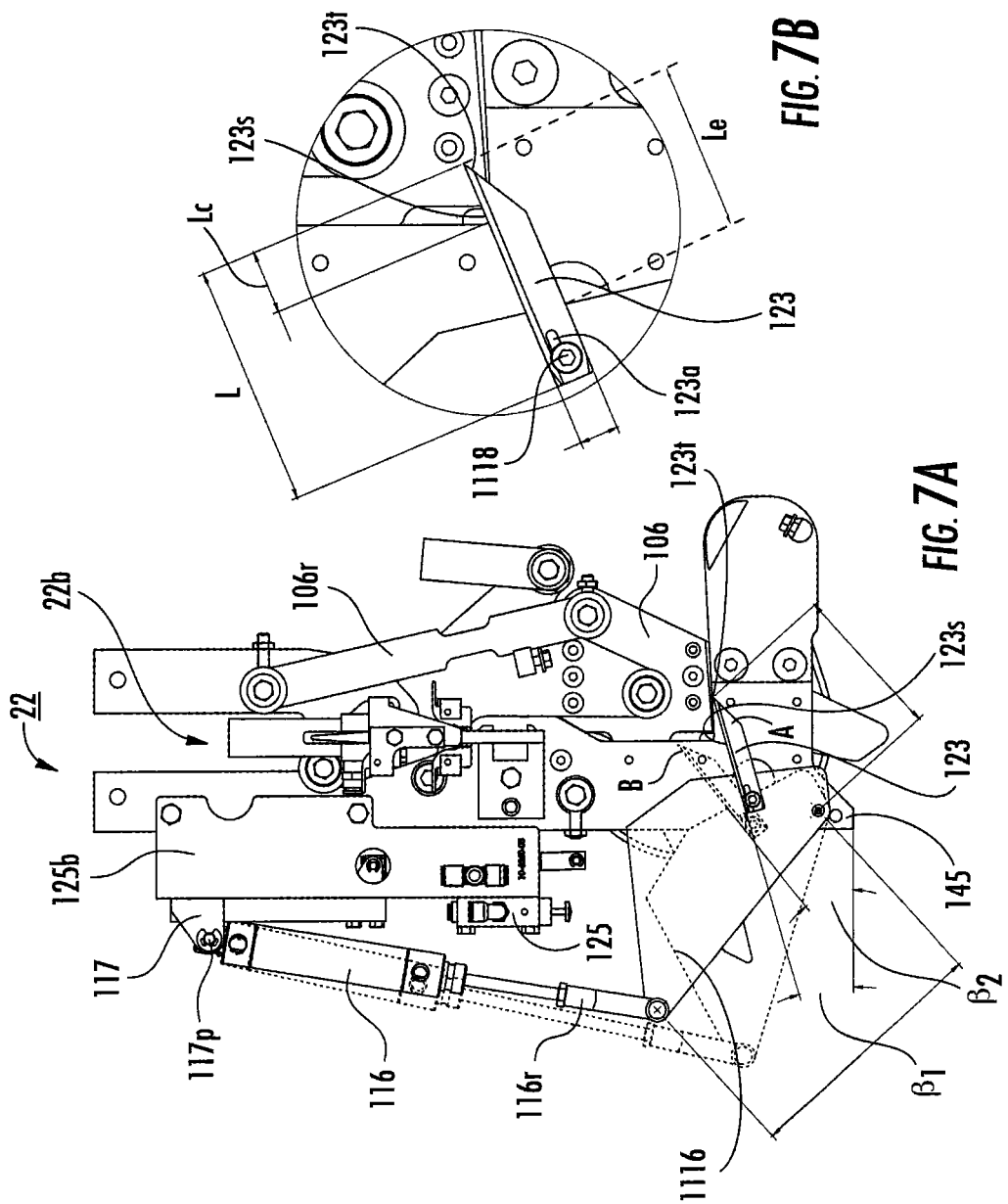

CUTTING DEVICES FOR PACKAGING SYSTEMS WITH CLIPPERS AND RELATED CLIPPER ASSEMBLIES

RELATED APPLICATIONS

This application claims the benefit of and priority to U.S. Provisional Application Ser. No. 62/212,193 filed Aug. 31, 2015, the contents of which are hereby incorporated by reference as if recited in full herein.

FIELD OF THE INVENTION

The present invention relates to knives for clippers.

BACKGROUND OF THE INVENTION

Conventionally, in the production of goods such as, for example, explosives, meat or other products, the product is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together a thin flexible material, typically elastomeric and/or polymeric material. U.S. Pat. Nos. 5,085,036 and 5,203,760 describe examples of automated substantially continuous-feed devices suitable for forming sheet material or flat roll stock into tubular film casings.

Rotating multi-clipper platform systems, such as the Rota-Clip® high speed packaging system by Tipper Tie, Apex, N.C., have been used to package emulsions, such as explosives. See, e.g., U.S. Pat. Nos. 4,821,485; 5,020,298; 5,259,168; 5,471,815; 5,644,896; 8,006,463; and U.S. Patent Application Publication No. 2015/0128524. The contents of the above referenced patents and patent application are hereby incorporated by reference as if recited in full herein.

SUMMARY OF EMBODIMENTS OF THE INVENTION

Embodiments of the invention provide clippers with a knife actuation cylinder positioned adjacent an upwardly extending body of a clipper, above a clip die, to automatically extend and retract a knife during respective clipping cycles.

Embodiments of the invention are particularly suitable for rotating platform systems with circumferentially spaced apart respective clipper stations.

Embodiments of the invention are directed to packaging systems that include a rotating table and a plurality of circumferentially spaced apart clipper assemblies held at respective clipper stations. Each clipper assembly includes a knife cylinder with a rod and a knife plate. The knife cylinder resides above the clip die laterally offset from a body of the clipper. The rod is attached to the knife plate at one externally facing end. The knife plate is also attached to a die support at a location closer to the clip die and holds a knife configured to either: (a) move upward upon extension of the rod or (b) move downward upon extension of the rod to cut a tail of clipped package.

The one or more clipper assemblies operate with a clipping cycle that includes automatically: (i) activating a gate valve to move a gate to a closed position; (ii) confirming if a voider plate is in position; (iii) if so, activating a punch valve to move a punch cylinder to drive a punch downward to punch a clip over a target product at the clip die; (iv) actuating a rod of a knife cylinder residing above the clip die to move a knife residing on a knife plate about 1 inch to cut a clipped package; and (v) opening the gate while retracting the knife and the punch cylinder.

Other embodiments are directed to packaging systems. The packaging systems include a rotating table and a plurality of circumferentially spaced apart clipper assemblies held at respective clipper stations. Each clipper assembly includes a clipper body with a die support holding at least one clip die and a a knife cylinder with a downwardly extending rod. The knife cylinder is attached to the clipper body above the clip die. The clipper assemblies also include a knife plate having a perimeter with a first portion pivotably attached to the rod and a laterally spaced apart second portion pivotably attached to the die support a distance below the clip die. The clipper assemblies also include a knife held by the knife plate with a cutting end portion extending a distance beyond the perimeter of the knife plate, at a location above the second portion of the knife plate. In operation, the knife is configured to either: (a) move upward to cut respective clipped packages or (b) move downward to cut respective clipped packages.

The knife can be configured to have at least one of the following features: (i) the knife extends out from one side of the knife plate at an angle of between 80-110 degrees, measured from a line drawn parallel to the side from which the knife extends outward from; and (ii) the knife has an exposed length extending from the knife plate that is between 0.75 and 2 inches.

The knife can be detachably held by the knife plate.

The knife can be configured to operate to move downward per (b) and can have a tip and a cutting surface. The cutting surface can face downward.

The rod of the knife cylinder can have an extended position when the knife is in a first position associated with a pre-cut (home/reset) position. The rod of the knife cylinder can have a retracted configuration when the knife is in a second position associated with a cut or post-cut position so that the knife is configured to cut with a downward movement as it moves from the pre-cut position to the cut or post-cut position.

The knife can extend out from one side of the knife plate at an angle of between 80-110 degrees, measured from a line drawn parallel to the side from which the knife extends outward from.

The knife plate can have a first aperture which receives a pin for the pivotable attachment to the rod. The knife plate can have a second aperture that receives a pin for the pivotable attachment to the die support. The first and second apertures can be spaced apart between 4-6 inches, measured center to center.

The knife can have an exposed length extending from the knife plate that is between 1 inch and 2 inches.

The knife can have a maximum cutting length from the tip of the knife inward a distance that is between 0.5 and 0.75 inches.

The knife can be configured to move downward to cut per (b). The knife cylinder, rod, knife plate and knife can cooperate to position the knife at an angle from horizontal that is greater in a home/pre-cut position than the angle from horizontal in a full/post-cut, downward position.

The angle from horizontal in the home/pre-cut position can be between 60 and 50 degrees.

The angle from horizontal in the full/post-cut, downward position can be between 30 and 40 degrees.

The knife can be configured to operate to cut in an upward direction per (a) and can have a tip and a cutting surface. The cutting surface can face upward. The rod of the knife cylinder can have a first retracted position when the knife is in a lower first position pre-cut (reset/home position). The rod of the knife cylinder can have a second extended configuration when the knife is in a second cut or post-cut position so that the knife can be configured to cut with an upward movement as it moves from the first pre-cut position to the second cut or post-cut position.

The knife plate can have a polygonal shape with five sides.

The knife plate shape can have a longest side as a bottom side.

The second portion that is pivotably attached to the die support can reside at a distance of between about 3 inches to about 3.5 inches from a tip of the knife in a full cut/post-cut position.

The knife plate can have a polygonal shape with five sides. Te knife plate shape can have a longest side as a bottom side, and wherein the second portion that is pivotably attached to the die support is a distance of between about 3.20 and 3.30 inches from a tip of the knife in a full cut/post-cut position.

Other aspects of the invention are directed to a clipper assembly. The clipper assembly can include a clipper body holding at least one clip die and a knife cylinder with a downwardly extending rod. The knife cylinder is attached to the clipper body above the clip die. The clipper assembly also includes a knife plate having a body with a perimeter. A first portion of the body of the knife plate is pivotably attached to the rod and a second portion of the body of the knife plate is pivotably attached to the clipper body below the clip die. The clipper assembly also includes a knife held by the knife plate. The knife extends outward from a side of the knife plate a distance that is between 0.75 inches and 2 inches and at an angle of between 80-110 degrees at a location above the second portion of the knife plate, measured from a line drawn parallel to the side from which the knife extends outward from. In operation, the knife is configured to either: (a) move upward to cut respective clipped packages or (b) move downward to cut respective clipped packages.

The knife plate can have a polygonal shape with between 3-6 sides, typically five sides.

The knife plate shape can have a longest side as a bottom side.

The second portion that is pivotably attached to the clipper body can reside at a distance of between about 3 inches to about 3.5 inches from a tip of the knife in a full cut position.

The knife can be detachably held by the knife plate. The first portion of the body of the knife plate can include a first aperture holding a first pin for pivotable attachment to the rod. The second portion of the body of the knife plate can include a second aperture holding a second pin attached to a die support of the clipper body for the pivotable attachment to the clipper body. The first and second apertures can be laterally spaced apart between 4-6 inches, center to center.

The knife can be configured to operate to cut in a downward direction per (b) and can have a tip and a cutting surface. The cutting surface can face downward. The rod of the knife cylinder can have a first extended position when the knife is in an upper first position associated with a pre-cut and/or home (reset) position. The rod of the knife cylinder can have a second retracted position when the knife is in a cut or post-cut position so that the knife can be configured to cut with a downward movement as it moves from the pre-cut position to the cut or post-cut position.

The knife can extend from the knife plate at an angle of between 90-100 degrees, measured from a line drawn parallel to the side from which the knife extends outward from.

The knife can have a maximum cutting length from the tip of the knife inward a distance that is between 0.5 and 0.75 inches.

The knife can be configured to move per (b). The knife cylinder, rod, knife plate and knife can cooperate to position the knife at an angle from horizontal that can be greater in a home/pre-cut position than the angle from horizontal in a full cut, downward position.

The angle from horizontal in the home/pre-cut position can be between 60 and 50 degrees. The angle from horizontal in the full cut, downward position can be between 30 and 40 degrees.

The knife can be configured to operate per (a) and has a tip and a cutting surface. The cutting surface can face upward. The rod of the knife cylinder can have a first retracted position when the knife is in a lower pre-cut position under the clip die. The rod of the knife cylinder can have a second extended position when the knife is in a cut or post-cut position so that the knife can be configured to cut with an upward movement as it moves from the pre-cut position to the cut or post-cut position.

The knife plate can have a polygonal shape with between 3-6 sides, typically five sides. The knife plate shape can have a longest side as a bottom side.

The second portion that is pivotably attached to a die support of the clipper body can reside a distance of between about 3.20 and 3.30 inches from a tip of the knife in the full cut position.

Still other embodiments are directed to clipper assemblies that include a clipper body holding at least one clip die and a a knife cylinder with a downwardly extending rod, the knife cylinder attached to the clipper body above the clip die. The clipper assemblies also include a knife plate having a body with a perimeter. A first portion of the body of the knife plate is pivotably attached to the rod and a second portion of the body of the knife plate is pivotably attached to the clipper body below the clip die. The clipper assemblies also include a knife held by the knife plate. The knife extends outward from a side of the knife plate a distance between 0.75 inches and 2 inches and at an angle of between 80-110 degrees at a location above the second portion of the knife plate, measured from a line drawn parallel to the side from which the knife extends outward from. In operation, the knife is configured to move downward to thereby cut gathered or "ropes" of film or casing extending between respective clipped packages.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIG. 7A is a side perspective view of another embodiment of a clipper assembly according to embodiments of the present invention.

FIG. 7B is an enlarged side view of a knife held by the clipper assembly in FIG. 7A according to embodiments of the present invention.

DETAILED DESCRIPTION OF EMBODIMENTS OF THE INVENTION

Figure 1:
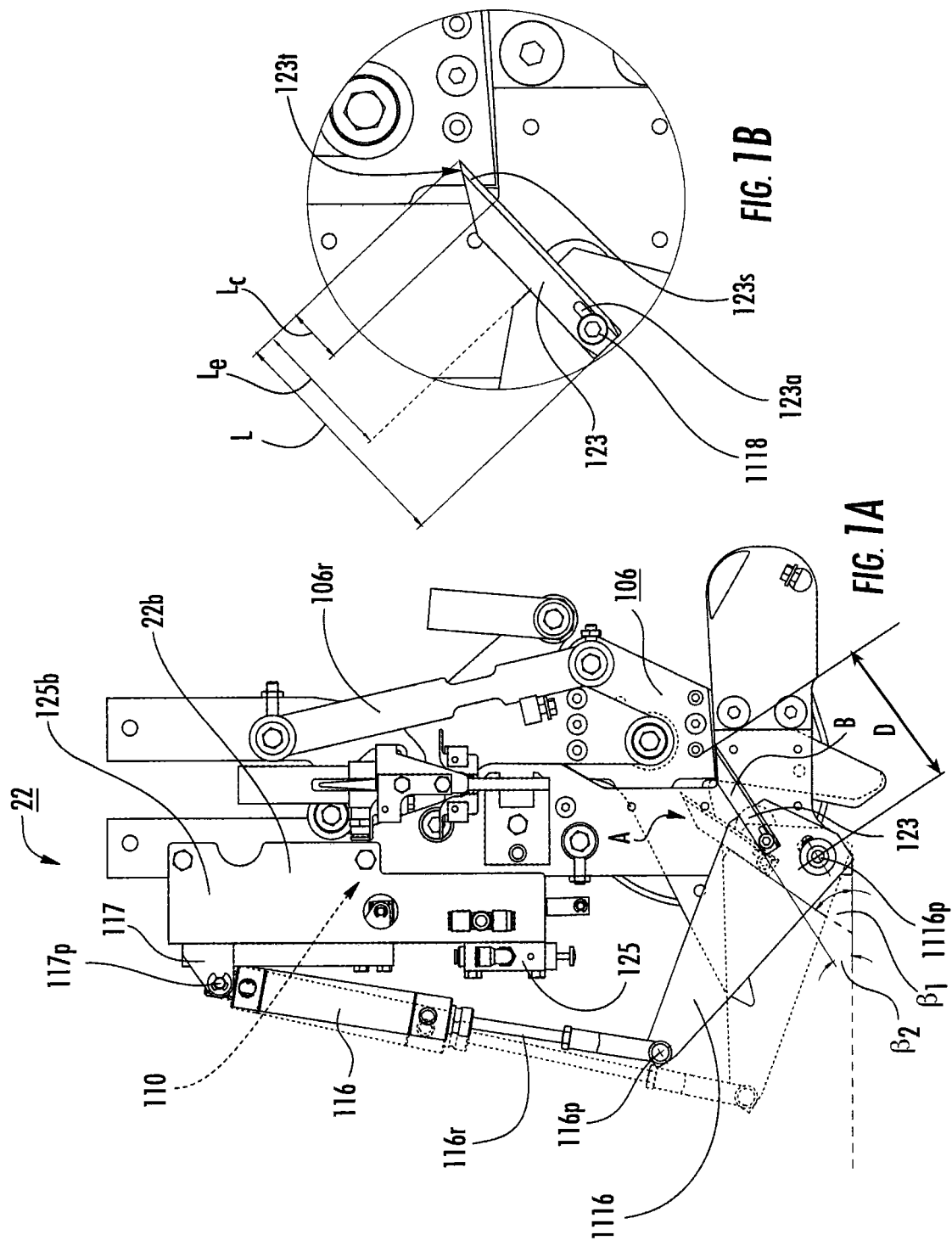
FIG. 1A is a side perspective view of a clipper assembly according to embodiments of the present invention.
FIG. 1B is an enlarged side view of a knife held by the clipper assembly of FIG. 1A according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Abbreviated versions of the word "Figure" such as "FIG." and "Fig." are used interchangeably with the word "Figure" in the application.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more IC (integrated Circuit) or Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. If the latter, a local computer and/or processor can communicate over a LAN, WAN and/or internet to transmit patient images.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The term "pie pan" refers to some embodiments of a rotating table that supports a plurality of clippers/clipper assemblies, with an upper surface of the table formed by adjacently positioned, circumferentially spaced apart wedge shape or pie-slice-like shapes, with a narrow end facing a center of the rotating table.

Figure 2:
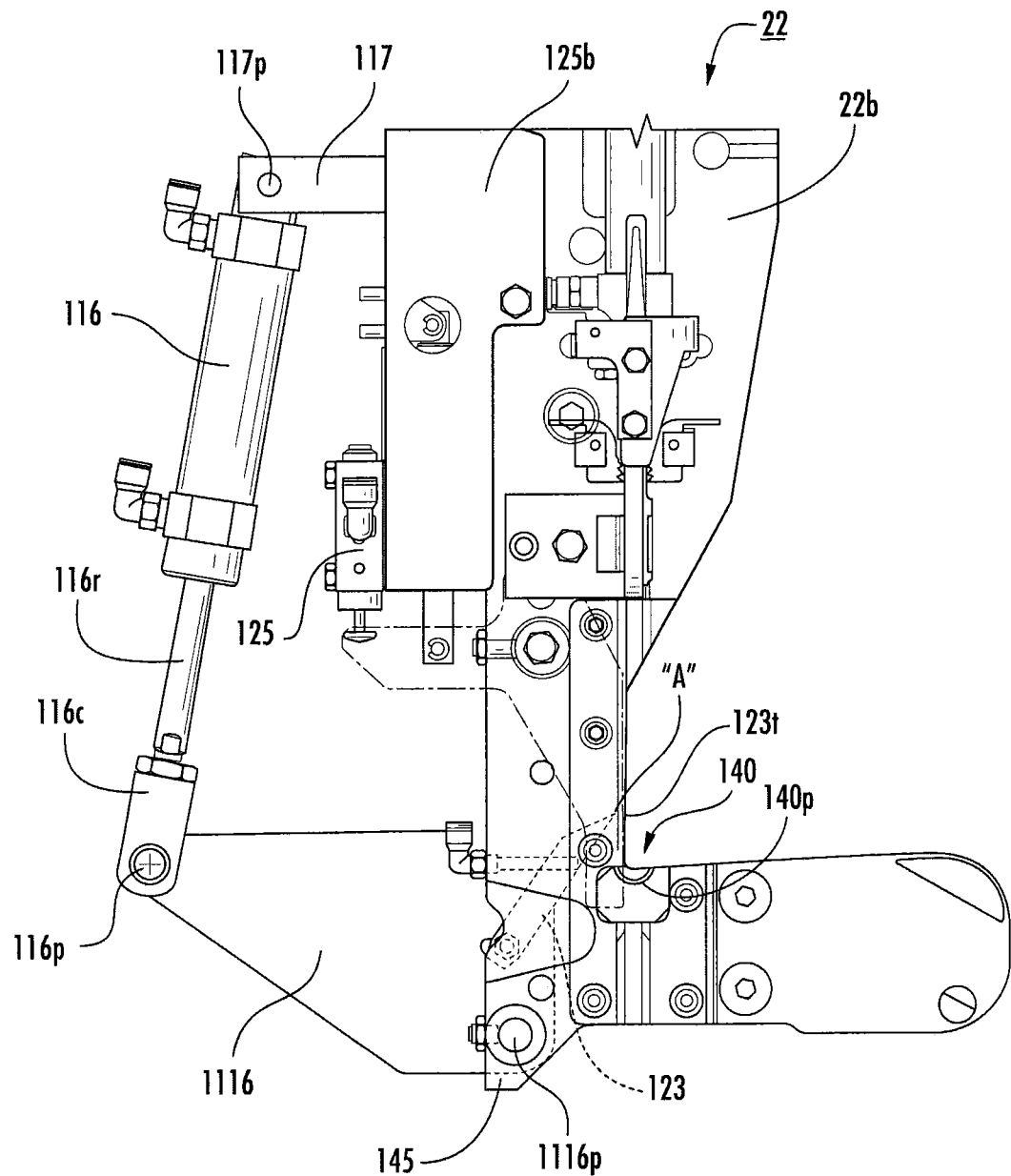
FIG. 2 is an enlarged, partially transparent view of a portion of the clipper assembly shown in FIG. 1A, with the knife in a "home" or pre-cut orientation according to embodiments of the present invention.
Figure 3:
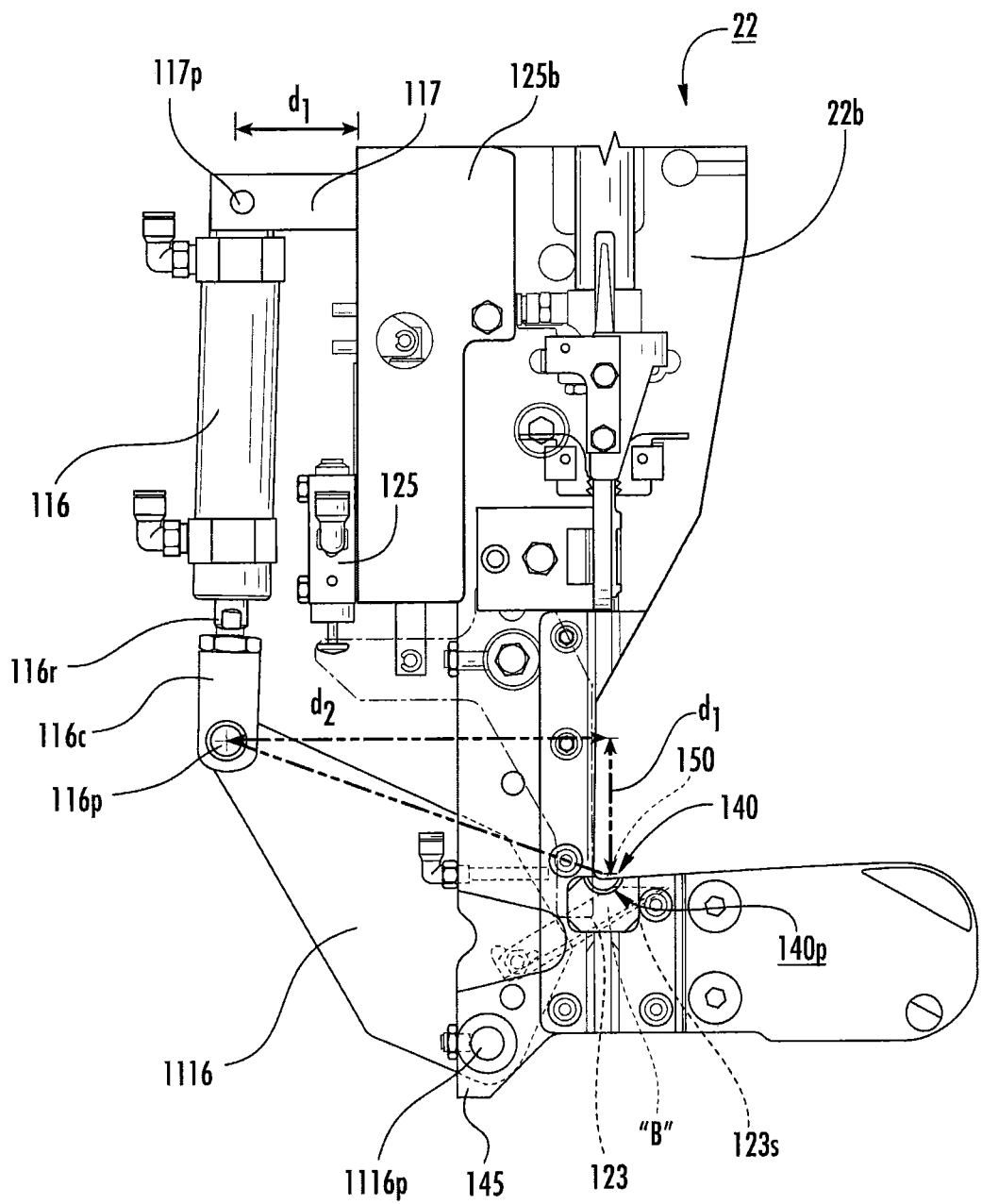
FIG. 3 is an enlarged, partially transparent view of a portion of the clipper assembly shown in FIG. 1A, with the knife in a cut/post-cut orientation according to embodiments of the present invention.

Referring now to the figures, FIGS. 1A, 1B, 2 and 3 illustrate an exemplary clipper assembly 22. As shown, the clipper assembly 22 includes a knife cylinder 116 with an actuation rod 116r (i.e., piston). The clipper assembly 22 also includes a knife plate 1116 (which can also be referred to as a link or linkage) that holds a knife 123. In operation, the cylinder 116 extends and retracts the rod 116r, which pivots the plate 1116 and causes the knife 123 to move between a "home" or pre-cut position A (FIG. 1A, phantom line of knife, FIG. 2), and to a cut/post cut-orientation at position B (FIG. 1A, FIG. 3). In this embodiment, the rod 116r is extended in the pre-cut position A (FIG. 2) and retracted in the full-cut (also referred to as the post-cut) or cut position (FIG. 3).

As shown in FIGS. 1A, 2 and 3, the knife cylinder 116 resides above the clip die 140 attached to the clipper assembly 22.

Figure 5:
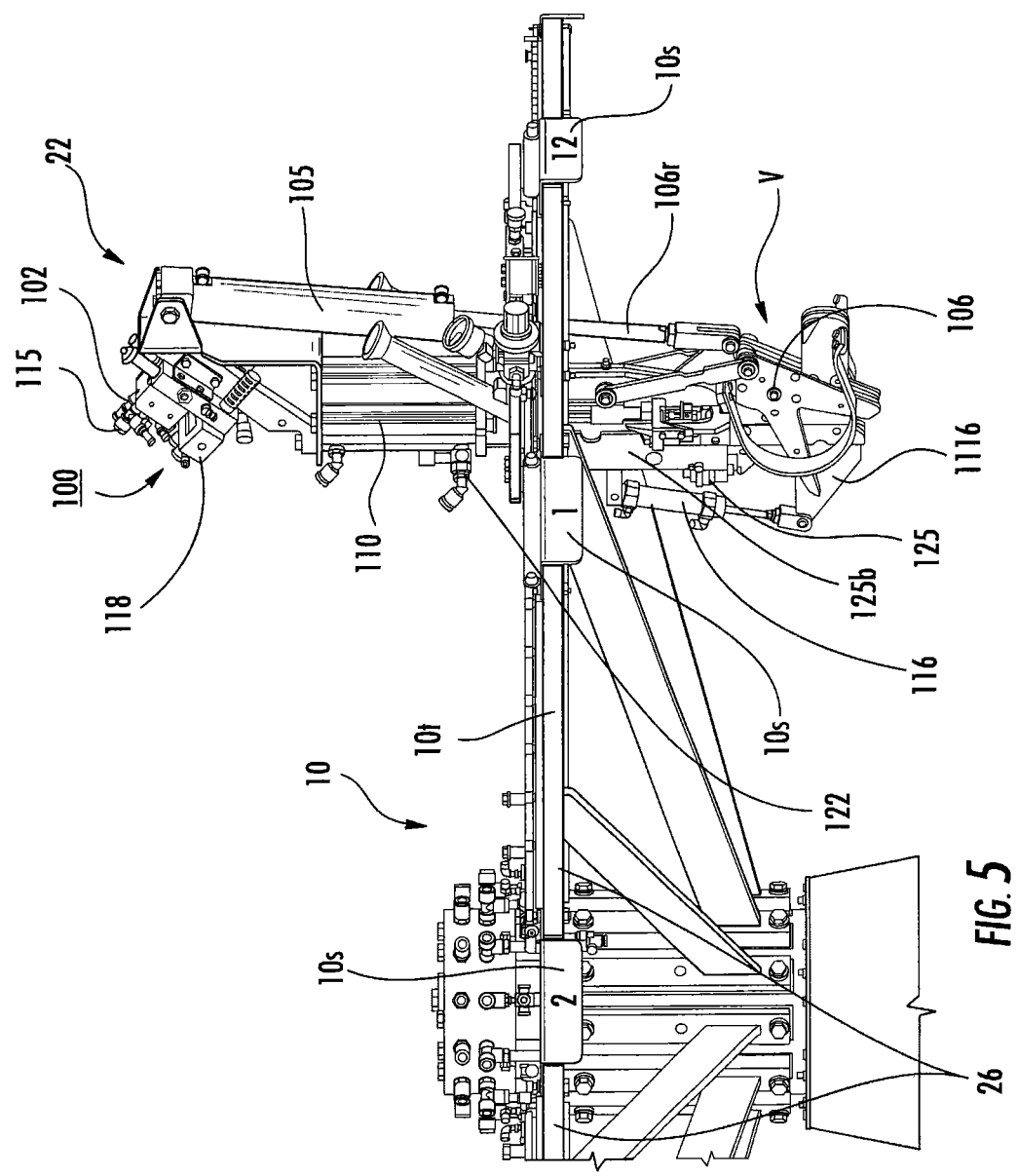
FIG. 5 is a side perspective view of a rotating table, multiple-clipper packaging system (without some clipper assemblies) according to embodiments of the present invention.

As shown in FIG. 5, in some embodiments, the clipper assemblies 22 can be part of a rotating clipper packaging system 10 (although the clipper assemblies 22 may be used with different packaging systems). The clipper assemblies 22 can held at respective clipper stations 10s (numbered 1-12 in the embodiment shown) with the knife cylinder 116 under a rotating table 10t of a packaging system 10. It is noted that a single clipper assembly 22 is shown in FIG. 5, but, in use, a plurality of circumferentially spaced apart clipper assemblies are in respective clipper stations 10s (and their radial positions can be adjusted on the table 10t as is well known).

Again referring to FIG. 5, the clipper assembly 22 can include a valve assembly 100 that holds a plurality of valves at a common location on a top portion of the clipper assembly 22. The valves are configured to provide pressurized gas, typically air, to defined components such as actuation cylinders or other components. However, the valves can be distributed or held separately or in different sub-combinations as subassemblies and/or positioned at other locations on the clipper assembly 22. The valve assembly 100 can include a gate valve 102, a punch valve 118, and a knife valve 115. The punch valve 118 provides pressurized air to a punch cylinder 110 that drives at least one punch to drive clips down to a clip die 140 (FIGS. 2, 3) to force a respective clip to close about a target (gathered) end portion of a product in a casing (i.e., film) as is well known to those of skill in the art.

The knife valve 115 supplies pressurized gas, typically air, to the knife cylinder 116 that can extend and retract the knife 123 to sever clipped end portions of the casing (i.e., film). The knife 123 has an exposed sharp cutting edge 123s oriented to face a cutting direction. The gate valve 102 supplies pressurized gas, typically air, to a gate cylinder 105. The gate cylinder 105 moves gate 106 (FIG. 1A, 2) in and out of operative position as is well known to those of skill in the art.

In some embodiments, the clipper assembly 22 includes a trigger bracket 125b that holds a trigger valve 125 that can trigger a punch action by the punch cylinder 110.

The clipper assembly 22 can include at least one voider plate V (FIG. 5) which can be pivotably attached to a die support 145 (FIGS. 2, 3). The die support 145 can hold/support the clip die 140. The clip die 140 has an upwardly facing curved pocket 140p as is well known. When in a defined position, the voider plate V can cause the trigger valve 125 to send a signal to the punch valve 118 to initiate a clip cycle where the punch operates to punch down to apply a clip.

As shown in FIGS. 1A, 2 and 3, the knife cylinder 116 can be attached to a clipper body 22b. In some embodiments, the upper end of the cylinder 116 can be held above the knife plate 1116.

The knife cylinder 116 can be attached to a rear clevis 117 by a pivot pin 117p that allows the cylinder to pivot laterally outward and inward relative to the clipper assembly 22. The rear clevis 117 faces away from the clip die 140 and can reside below the punch cylinder 110 (FIG. 5). In some embodiments, the rear clevis 117 can be attached to an upper portion of the trigger bracket 125b, but other attachment configurations to the clipper body 22b are contemplated. The rear clevis 117 can have a relatively short length of between 1-3 inches, typically about 1-2.5 inches, such as 1.5 inches, 1.75 inches, 2 inches, 2.25 inches and 2.5 inches, in some embodiments.

The rod 116r can be pivotably attached to the knife plate 1116, typically via a pin 116p. The rod 116r can have a clevis 116c that attaches to the knife plate 1116 using the pin 116p. The knife plate 1116 can have an aperture $1116a_1$ (FIG. 4) that receives the pin 116p. The knife plate 1116 can be pivotably attached to the die support 145 at a location beneath and laterally spaced apart from (laterally and longitudinally offset from) the clip die 140. The pivot 1116p can reside a distance D from the tip of the knife 123t, which can be between 2-4 inches, typically between 3-3.5 inches such as 3.24 or 3.25 inches, with the pivot 1116*p* below the knife 123 as shown in FIG. 1A.

Figure 4:
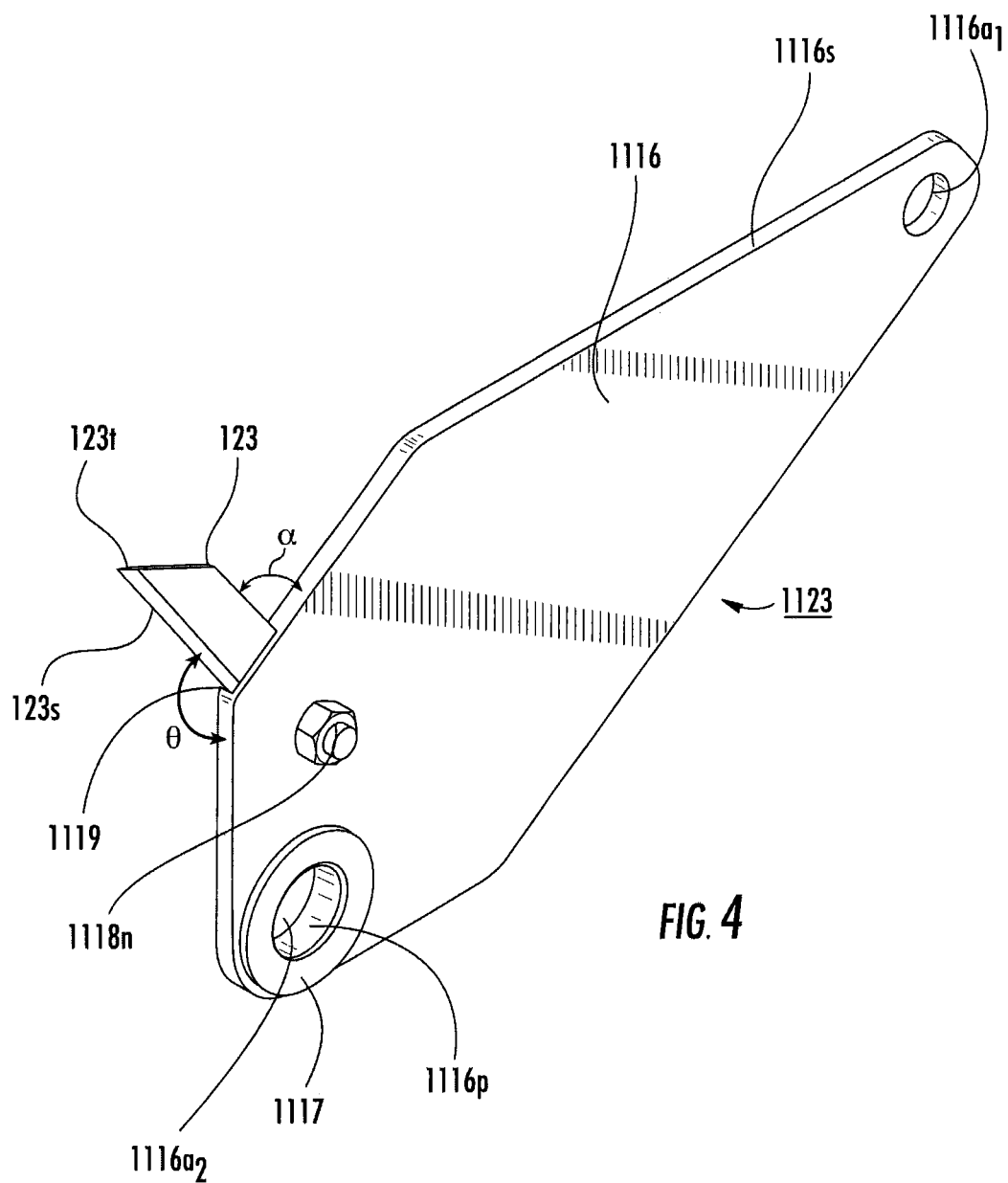
FIG. 4 is a greatly enlarged side perspective view of an exemplary knife plate or linkage holding the knife for a clipper assembly according to embodiments of the present invention.

As shown in FIG. 4, the knife plate 1116 can have a second aperture 1116*a*$_2$ that is spaced apart from the first aperture 1116*a*$_1$ that receives a pin 1116*p* for the pivoting attachment. The knife plate 1116 can include at least one bushing 1117 that holds the pin 1118.

As shown in FIGS. 1B and 4, the knife 123 can be detachably held by the knife plate 1116. The knife 123 can be attached to the knife plate 1116 using an attachment member 1118 such as a pin and/or threaded member that engages a nut 1118*n*. The knife 123 can have a longitudinally extending slot 123*a* that allows for positional adjustment of the knife 123 relative to the knife plate 1116. The knife plate 1116 can have a planar slot 1119 that holds the knife 123.

In some embodiments, a quick release at a pivot joint 116*p* and/or 1116*p* can hold the pivoting knife plate 1116, e.g., a clevis detachably holding a ring cotter and pin, so that the blade 123 can be changed quickly. To replace a blade 123, the pin can be pulled from one pivot joint (e.g., either 116*p* or 1116*p*) and the knife plate 1116 can be rotated about the other pivot joint (typically rearwardly for ease of access), either 1116*p* or 116*p*, respectively, and the blade 123 can be replaced, then rotated back into position and easily connected again by inserting the pin and locking in place with ring cotter.

The knife plate 1116 can have a planar body shape 1116*s* with a perimeter. The perimeter can be curvilinear and can position the two attachment apertures 1116*a*$_1$, 1116*a*$_2$ a distance apart from each other (measured from centerline to centerline of the respective apertures), between about 4-6 inches, more typically between about 5 inches and 5.5 inches, such as about 5.19 inches or 5.4 inches, in some embodiments.

The tip of the knife 123*t* can reside at a maximal lateral distance of between 3-4 inches, from the centerline of the pivot/aperture 1116*a*$_2$, which can be in position "B" in FIG. 1A or position "A" in FIG. 7A. In some particular embodiments, the maximal extension distance of the tip of the knife 123*t* is 3.24 inches in position B for the downward cutting configuration and 3.30 inches in position A for the upward cutting configuration.

Referring again to FIG. 1A, the knife 123 can be configured to cut in a downward direction, opposite conventional operation. In the embodiment shown in FIGS. 1A, 1B, 2 and 3, the knife 123 moves from a up position A to cut in a downward direction, toward position B. The knife 123 can have an angle β1 measured from horizontal at position A (pre-cut/home or "reset" position) that is greater than angle β2 at position B (after the cut or extended position) by between about 10 degrees and about 30 degrees, more typically between about 20 degrees and 25 degrees. In some embodiments, β1 is about 55 degrees and β2 is about 33-40 degrees, such as about 35 degrees.

As shown in FIG. 1B, for example, the knife 123 can have a cutting surface 123*s* that faces down. The knife 123 can be configured to have a maximum cut length Lc at a forward edge portion of the knife that extends to the tip of the knife 123*t* that is between about 0.5 inches and about 0.75 inches, typically about 0.59 inches. The cut length Lc is that length that active cuts and can extend through a slot or channel 150 (FIG. 10) in the clipper assembly 22 (typically in a voider plate) to contact gathered segments of packaging between adjacent clipped segments (see, e.g., FIG. 10).

The knife 123 can have an overall length L which may be between 2-3 inches, typically about 2.59 inches. The knife 123 can have an exposed length Le that extends a distance beyond a perimeter of the knife plate 1116*s*. In some embodiments, the exposed length Le is between 0.75 and 2 inches, including, for example, about 1 inch, about 1.25 inches, about 1.5 inches, about 1.75 inches and about 2 inches.

The exposed length Le providing the cutting length Lc of the knife 123 can be important as its reach should be long enough to extend across the largest gathered segment of target film or casing, e.g,. "rope" size. The angle and amount of movement is such that the cutting length Lc of the knife 123 is not exposed during the film gathering, and the stroke has to be sufficient enough so the cutting surface 123*s* with tip 123*t* extends past the gathered "rope" to carry out the cutting operation.

FIGS. 3 and 7 illustrates that the rod/pivot attachment 116*p* (e.g., measured at the center of the aperture 1116*a*$_1$) can reside a lateral distance d2 and a longitudinal distance d1 away from a center of the pocket 140*p* of the clip die 140, where d2>d1. In some embodiments, d1 can be between about 1.5 to about 2 inches, such as about 1.8 inches. For FIG. 3, this is the post-cut or "full" cut position "B" which positions the cutting length Lc of the knife under or in front of the pocket 140*p* of the clip die 140. For FIG. 8, this is the pre-cut or "A" position which positions the cutting length Lc of the knife under or in front of the pocket 140*p* of the clip die 140.

Figure 8:
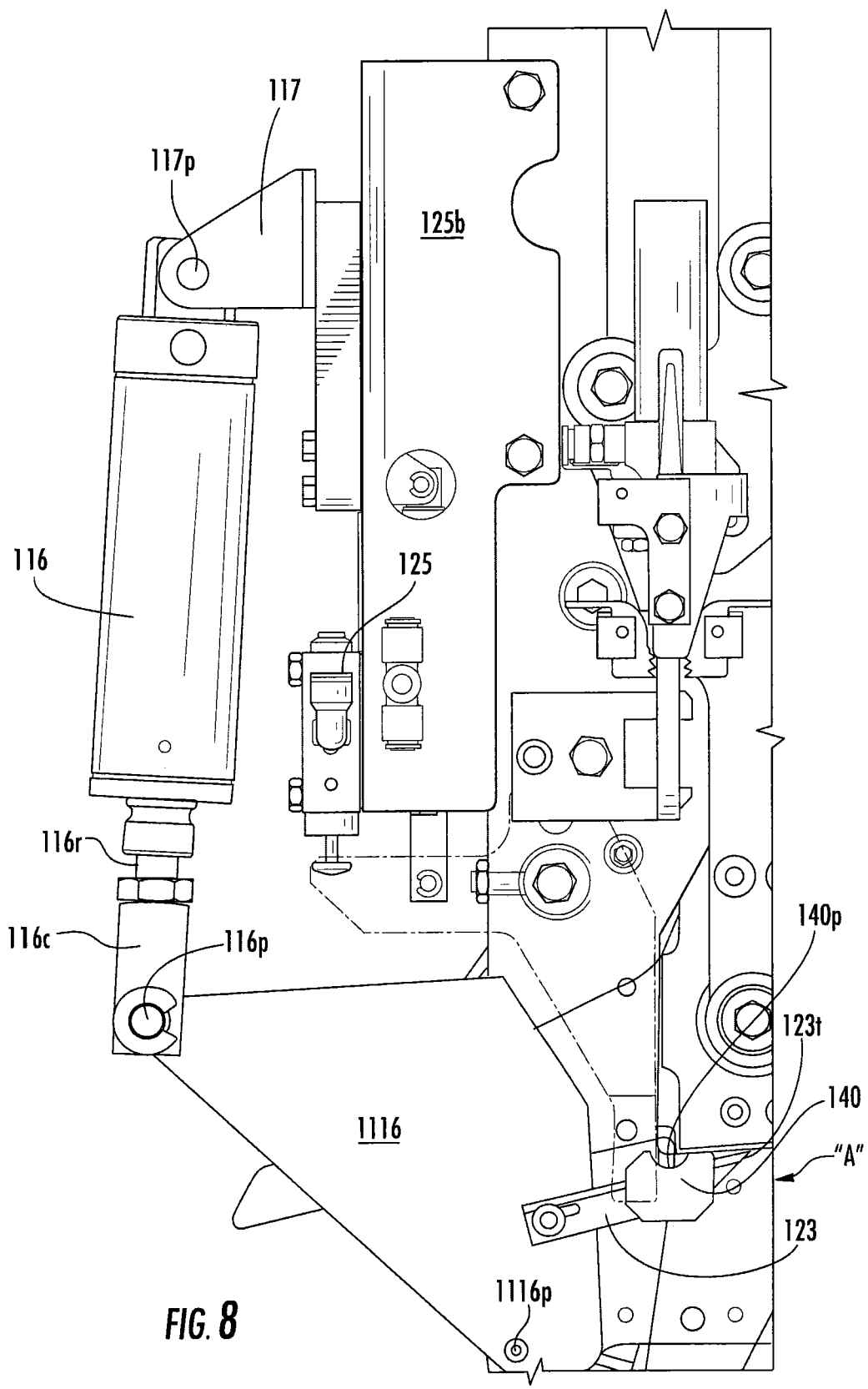
FIG. 8 is an enlarged, partially transparent, side view of the clipper assembly shown in FIG. 7A, illustrating the knife blade below the upper surface of the clip die in a "home" or pre-cut orientation according to embodiments of the present invention.
Figure 9:
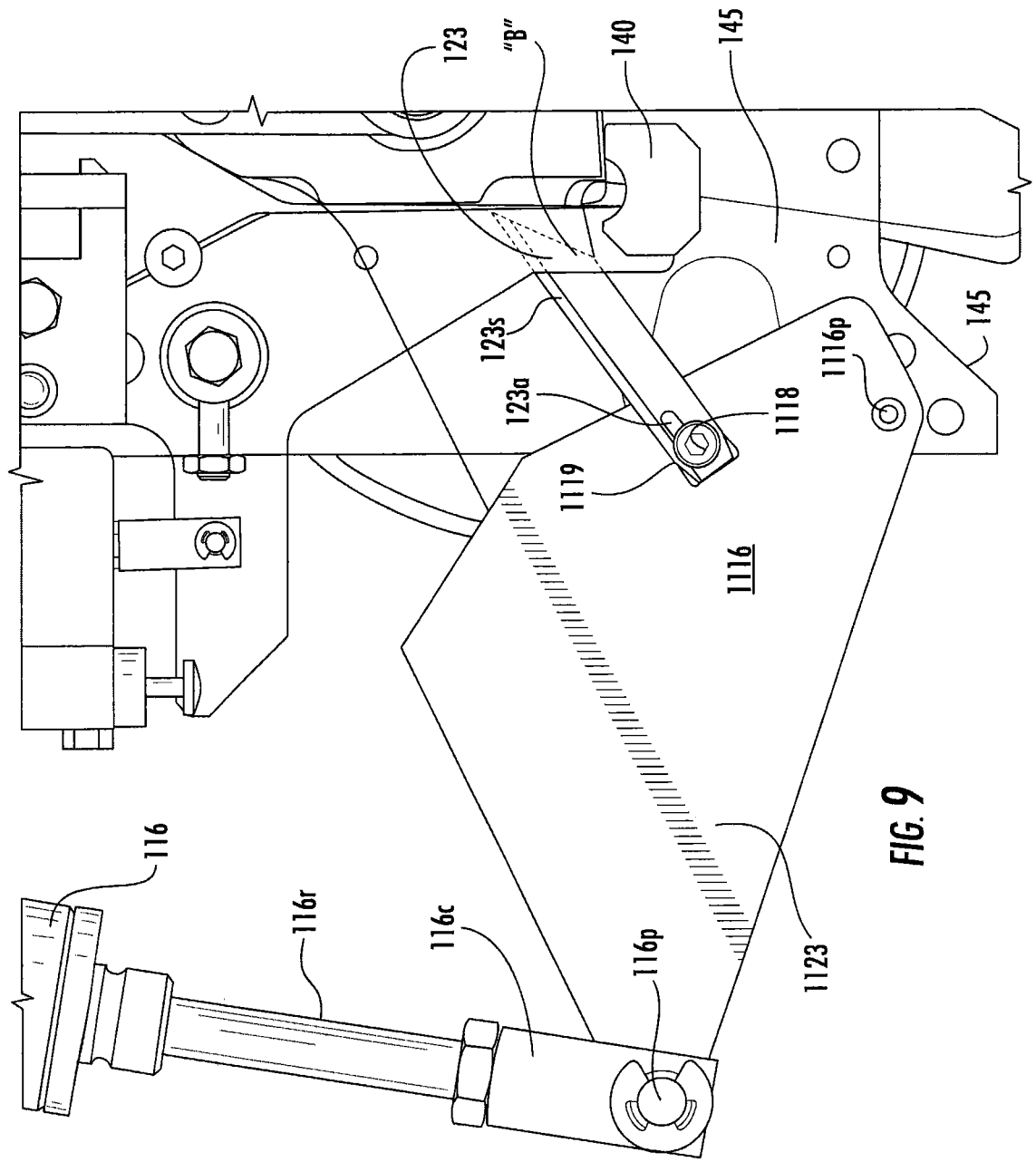
FIG. 9 is an enlarged, partial side view of the device shown in FIG. 7A with the knife blade above below the upper surface of the clip die in a cut/post-cut orientation according to embodiments of the present invention.
Figure 10:
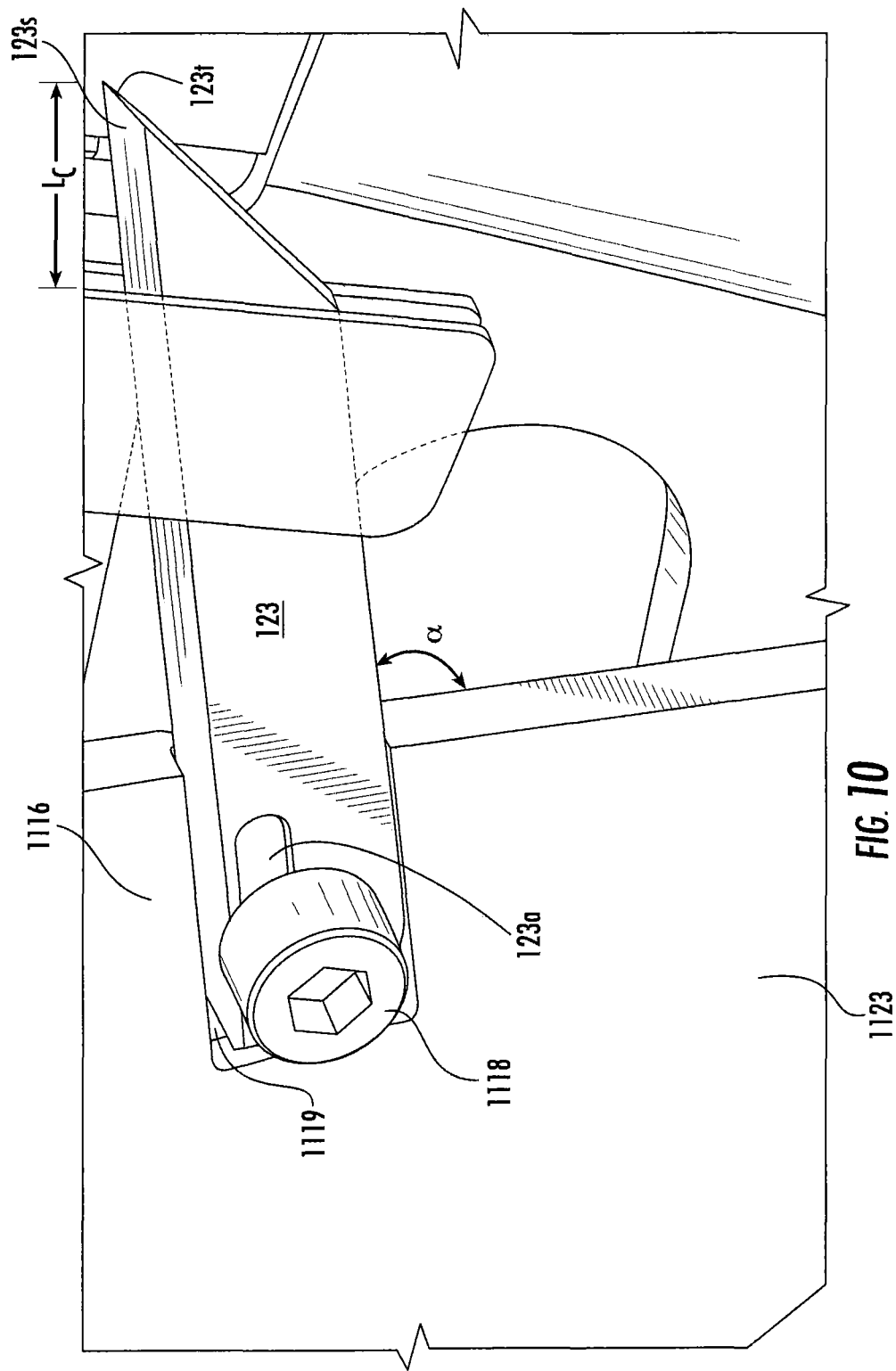
FIG. 10 is a greatly enlarged view of a knife blade extended through die supports in a slot of a voider plate for clipping end portions of respective packages according to embodiments of the present invention.

FIGS. 7A, 7B, 8, 9 and 10 illustrate another embodiment of the clipper assembly 22. In this embodiment, the knife cuts upward from position A to position B. FIG. 7A and FIG. 8 shows the assembly with the knife 123 in position A. FIG. 7A and 9 show the assembly 22 with the knife 123 in position B. FIG. 10 is a greatly enlarged view of the knife 123 with the cutting surface 123*s* facing upward.

The knife plate 1116 can form part of a knife plate assembly 1123 as shown in FIGS. 4, 9, 10 and 11. The knife plate assembly 1123 can releasably engage the knife 123 to the knife plate 1119 and/or the entire assembly 1123 can releasably engage the clipper assembly 22.

The knife plate 1116 can have a polygonal perimeter 1116*s* with between 3-7 planar sides, shown as five planar sides in FIGS. 1A, 4 and 7A. The longest side can be the bottom side as shown. However, other shapes may be used.

As shown in FIGS. 1A, 4 and 7A, the knife plate 1116 is attached at one end portion to the rod 116*r* and at a second opposing end portion to the die support 145. The knife 123 is mounted closer to the second end portion above the aperture 1116*a*$_2$.

The knife 123 can extend angularly out from a perimeter of the linkage plate 1116 so that a length of the knife 123 is exposed with the cutting surface 123*s* facing upward (FIG. 1A) or downward (FIG. 7A).

As shown in FIGS. 4 and 10, for example, the knife 123 can extend off one side of the linkage plate 1116 at an angle α of between about 80-110 degrees, more typically by about 90-100 degrees, for a distance of between 0.75 inches to about 2 inches, more typically between about 1 inch and 1.75 inches such as about 1.5 inches.

As shown in FIG. 4, for example, the knife 123 can reside adjacent a side of the linkage plate 1116 and extend outward relative thereto at an angle θ of between about 120-160 degrees, more typically by between about 130-150 degrees, such as about 145 degrees, for a distance of between 0.75 inches to about 2 inches, more typically between about 1 inch and 1.75 inches such as about 1.5 inches.

As shown in FIGS. 9 and 10, the outer end of the knife 123 can be extended through die supports 145 into a slot 150 of a voider plate V for clipping end portions of respective packages according to embodiments of the present invention.

Figure 11:
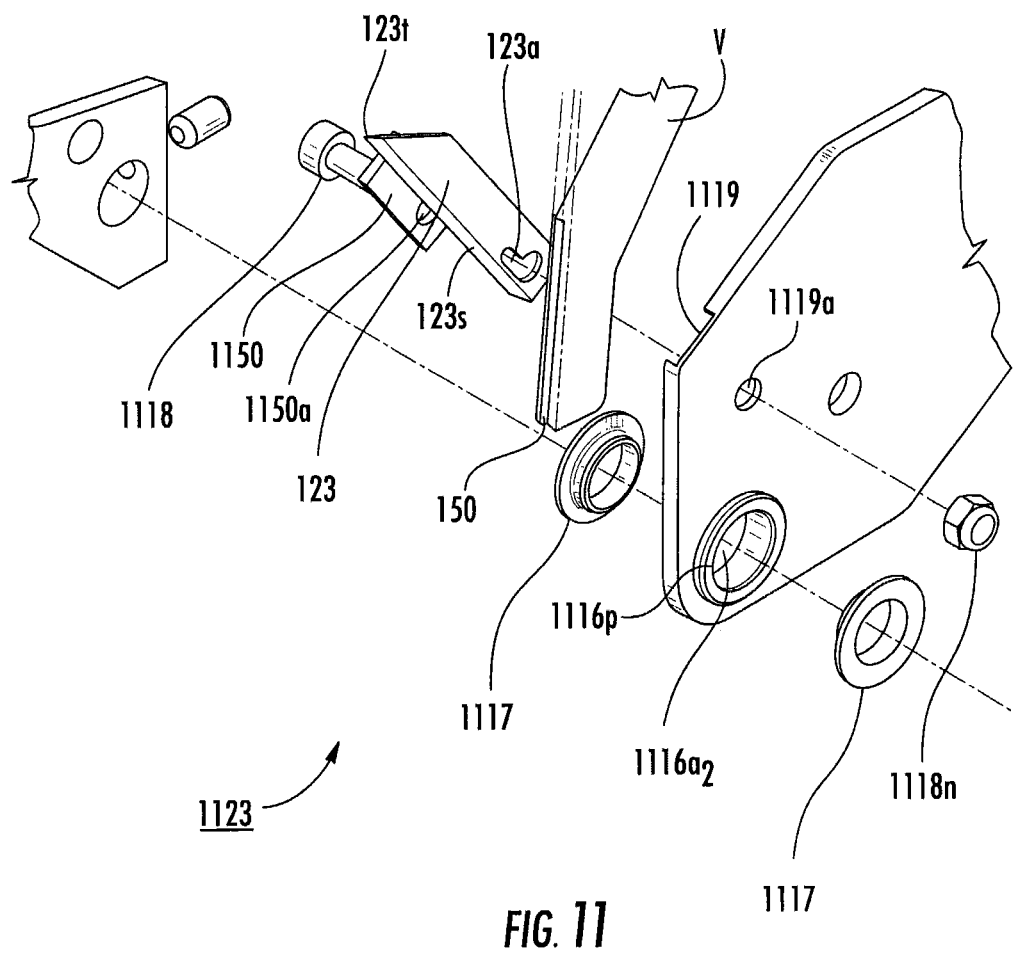
FIG. 11 is a partial exploded view of an exemplary knife plate assembly according to embodiments of the present invention.

FIG. 11 is an exploded view of another embodiment of a knife assembly 1123. In this embodiment, the attachment member 1118 can be secured to the knife plate 1116 via a nut 1118n such as a lock nut which can comprise a nylon-insert lock nut, polymer-insert lock nut, or elastic stop nut, for example. The lock nut can comprise a nylon collar insert or coating that resists turning. Suitable NYLOK® lock nuts are available from Nylok LLC, having a place of business in Lincolnwood, Ill. The knife assembly 1123 can also include a washer plate 1150 that sandwiches the knife 123 between the washer plate 1150 and the knife plate 1116, typically in the slot 1119 that faces the knife 123, while exposing the cutting surface 123s. The washer plate 1150 can include a slot or aperture 1150a for allowing the attachment member 1118 to extend therethrough. The knife 123 can include a shaped slot 123a that receives the attachment member 1118 that extends through the washer plate 1150 and the knife plate 1116, via aperture 1119a in the slot 1119, to attach to the nut 1118. The washer plate 1150 can cooperate with the knife plate 1116 to provide structural rigidity or support for the knife 123. As before, the knife plate 1119 can include an aperture 116$a_2$ that holds bushings 1117 for the pivot attachment 1116p. The knife 123 can extend through the slot 150 of the voider plate V during operation.

The clipper assemblies 22 can have single or dual clipper configurations. Dual clipper configurations employ two punches, typically operated using a single pneumatic cylinder 110. See, U.S. Pat. No. 5,495,701, which describes a mechanism that has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. See also, U.S. Pat. No. 6,920,738 and U.S. Pat. No. 5,586,424 for discussion of clippers and movement of U-shaped clips along a rail, as well as a clip feed for advancing clips on a guide rail and an arm that is reciprocally driven by a piston and cylinder arrangement. The contents of each of these patents are hereby incorporated by reference as if recited in full herein.

The clipper assembly 22 can have a defined clipping cycle to successively and rapidly clip lengths of filled casing. The clipping cycle includes a reset period during which the cylinders 105, 110, 116 can reset to a retracted or home position/configuration substantially simultaneously. Within the clipping cycle, about half of the time is for clipping and resetting.

As is also shown in FIG. 5, the clipper assembly 22 can include an onboard end of stroke sensor (EOSS) valve 122 in communication with the punch/punch cylinder 110 and is conventional and well known to those of skill in the art. The clipper assembly 22 may also optionally include a pulse valve for a clip blow off function (not shown). See, U.S. Patent Application Publication No. 2015/0128524, the contents of which are hereby incorporated by reference as if recited in full herein.

Figure 6A:
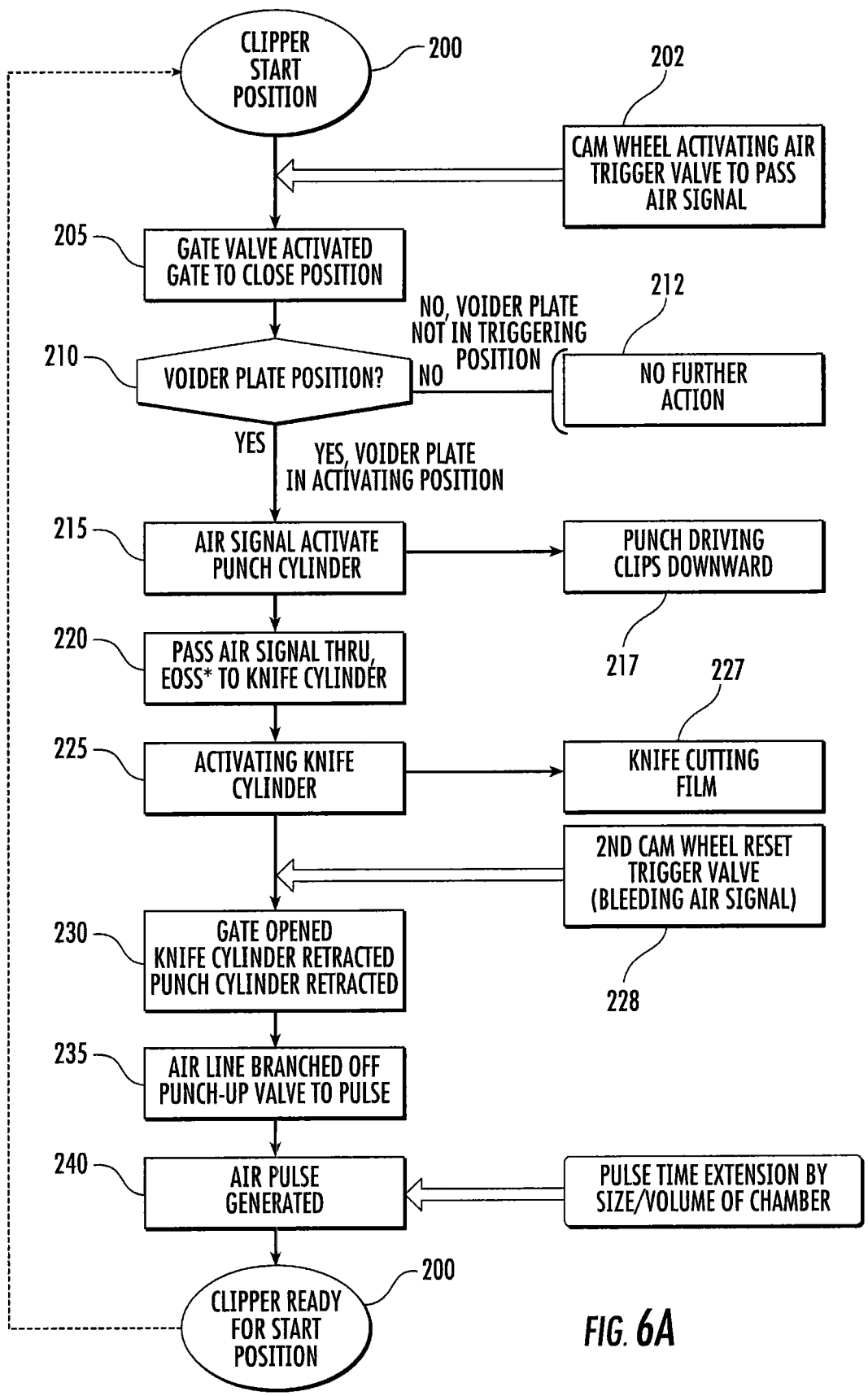
FIG. 6A is a flow chart of exemplary actions that can be carried out for a respective clip cycle according to embodiments of the present invention.

FIG. 6A illustrates an exemplary (successively repeatable) clipping cycle having an optional clip blow off operation according to some embodiments of the present invention. As shown, the clipper assembly has a start position (block 200). The gate valve 102 is activated to move the gate 106 to a closed position (block 205). A sensor can detect whether a voider plate is in position (block 210). For safety, further action can be prevented if the voider plate is not in its operative position (block 212). If yes, an air signal can activate the punch cylinder (block 215). This drives the clips downward over and into the clip die (block 217). The air signal is passed through the EOSS to the knife cylinder (block 220). The knife cylinder 116 is activated (bock 225). The knife 123 then cuts the film or casing (block 227).

Optionally, a second cam wheel can reset the trigger valve (bleeding air signal) (block 228).

The gate can be opened, the knife cylinder retracted and the punch cylinder retracted (block 230).

Air can be branched off from the punch valve to the pulse valve (block 235) to generate the clip blow-off air pulse.

Figure 6B:
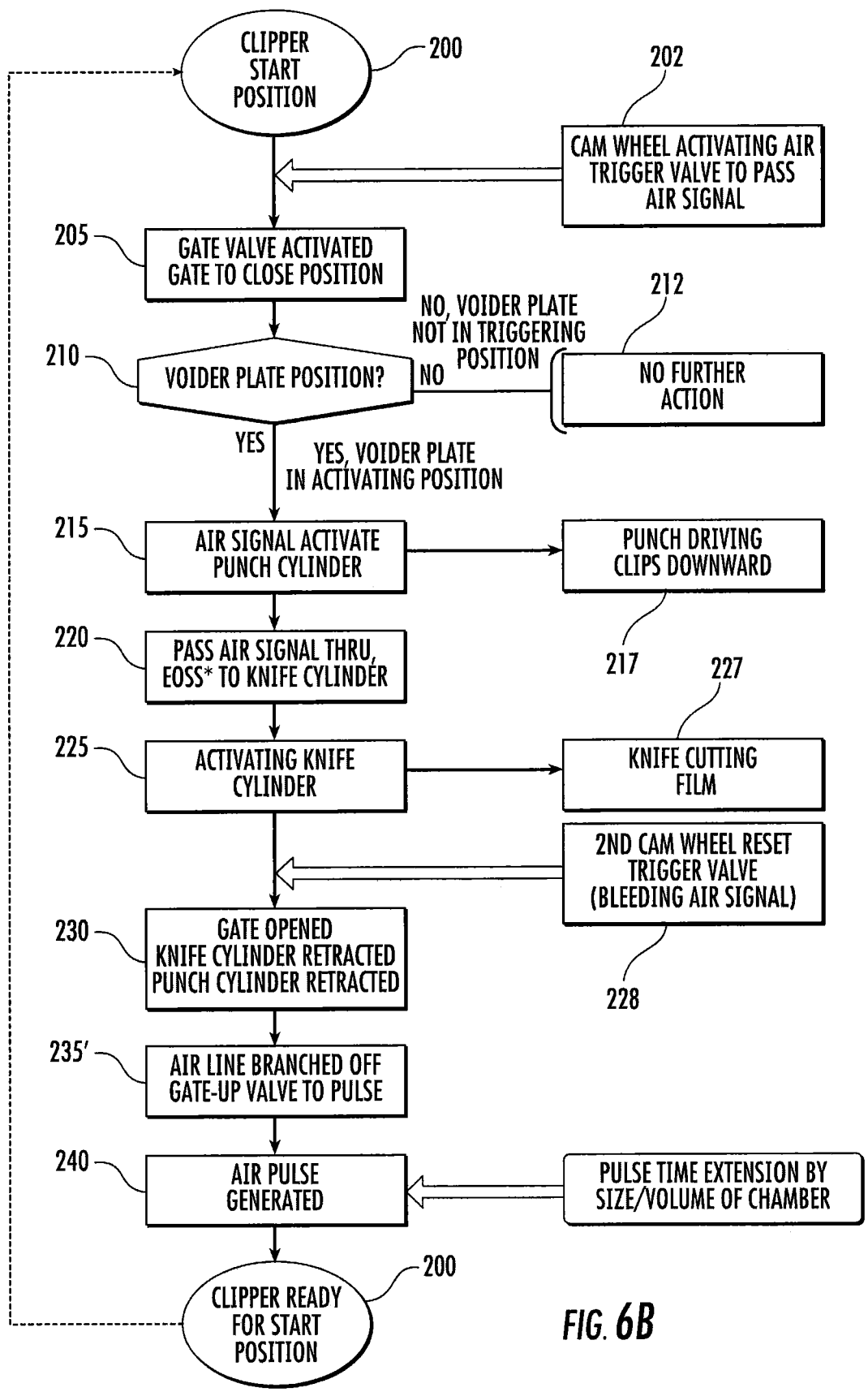
FIG. 6B is another flow chart of exemplary actions that can be carried out for a respective clip cycle according to embodiments of the present invention.

Alternatively, as shown in FIG. 6B, an air line can branch off the gate-up valve to generate a supply of air for the pulse valve (block 235'). The clip blow-off air pulse can be generated by the pulse valve (block 240). The clipper is ready for a subsequent cycle in the start position (block 200) to repeat the cycle. Again, the clip blow off function/features are optional and merely provided by way of example with the clip cycle.

The packaging systems 10 with at least one clipper assembly 22 can be configured to clip encased elongated or tubular product. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, sugar, sand, explosives and the like or other flowable or emulsion materials including wet pet food (similar to that held conventionally in cans) or other powder, granular, solid, semi-solid or gelatinous materials. The product may be a packaged in any suitable industry including food, aquaculture, agriculture, environment, chemical, explosives, or other applications.

Embodiments of the present invention are particularly suitable for producing encased products using the clippers to apply clips to seal or clip end portions of long products held in the casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. When used with food products, the film, casing or covering should be food-compatible. The film/casing can be sealed in situ during operation at a speed that feeds the rotating table of clippers at a desired production speed.

Figure 12:
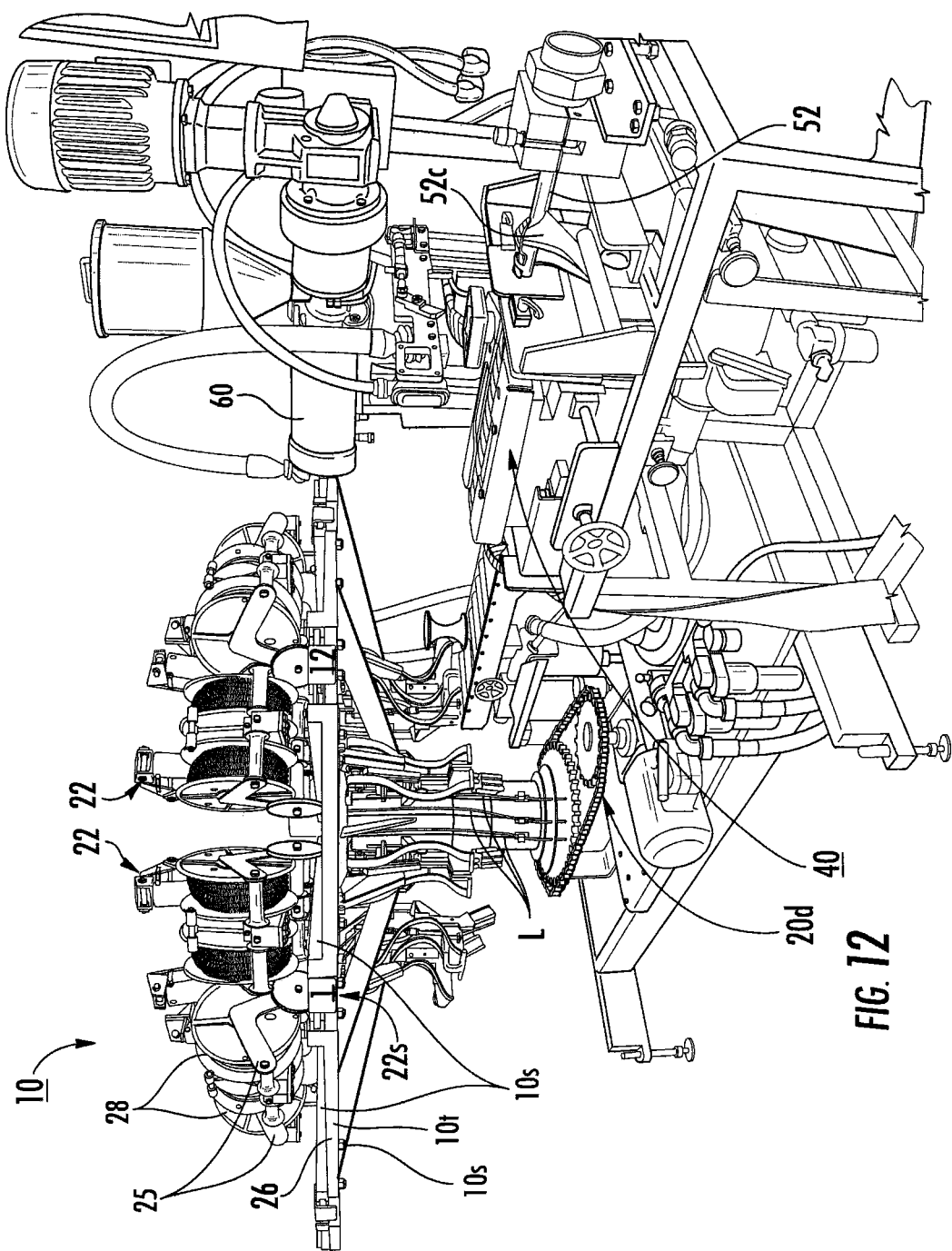
FIG. 12 is a front perspective view of an exemplary multi-clipper rotating packaging system according to embodiments of the present invention.

Referring to FIGS. 5 and 12, although shown as including twelve clipper stations 10s with respective (typically dual) clipper assemblies 22, not all clipper assemblies 22 need be operational during a particular cycle and/or packaging operation (e.g., alternating ones can be deactivated). The table 10t may include other numbers of clipper assemblies 22, typically between 10-14. Exemplary Rota-Clip® systems are available from Tipper Tie, Apex, N.C. Further description of exemplary components and operation are described by the patents incorporated by reference in the Background section of this document. Further, although shown with an adhesive seal system, tape or heat band seal systems may also or alternatively be used.

FIG. 12 illustrates that the rotating table 10*t* can be in alignment with a film forming module 52 with a forming collar 52*c*, a film drive assembly 40 and an adhesive seal system 60 that seal long edges of tubular shaped flat roll stock film downstream of the forming collar 52*c*. However, tape or heat band or other seal systems may also be used. The table 10*t* can also include a drive system 20*d* that rotates the table.

The table 10*t* can support clip spools 28 in a spool mount assembly 25 typically provided as spool cradles that can hold pairs of spools side by side.

The number of clipper assemblies 22 used in combination with the circumference of the table 10*t*, and/or the radially adjusted position of the clipper assemblies 22 on the table 10*t* can allow for different lengths of end product to be produced. For example, for the same clipper radial positions, one operation using all twelve clipper assemblies 22 can produce a six-inch product and, if every other clipper assembly 22 is deactivated, up to a 36 inch product. Larger and smaller length sizes can be achieved using alternate configurations.

As with conventional rotating platform clippers, in operation, the sealed filled tubular covering or casing can be clipped under the platform table surface.

In some embodiments, the table 10*t* can accept different sized clippers 22, such as a "100" series clipper available from Tipper Tie, Inc., Apex, N.C. and a "200" series clipper available from Tipper Tie, Inc., Apex, NC. The 100 series can have a 100T clip size and the 200 series clipper can operate with a Z200 clip size.

FIGS. 5 and 12 illustrate that the table 10*t* can have circumferentially spaced apart pie pan members 26 (shown as 12 such members) that hold spaced apart plates on long ends thereof.

The operation and sequence of events and can be controlled by a programmable logic controller (PLC). The operational mode and certain input parameters or machine controls can be selected or controlled by an operator input using a Human Machine Interface (HMI) to communicate with the controller as is well known to those of skill in the art.

The flow chart illustrates the architecture, functionality, and operation of possible implementations of embodiments of the present invention. In this regard, each block in the flow chart represents a module, segment, mechanical action or portion of code, which comprises one or more executable instructions for implementing the specified function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A clipper assembly, comprising:
   a clipper body holding at least one clip die;
   a knife cylinder with a downwardly extending rod, the knife cylinder attached to the clipper body above the clip die;
   a knife plate having a body with a perimeter, wherein a first portion of the body of the knife plate is pivotably attached to the rod at a first pivot attachment location on the body and a second portion of the body of the knife plate is pivotably attached to the clipper body below the clip die at a second pivot attachment location on the body; and
   a longitudinal knife held by the knife plate, wherein the knife extends outward laterally from a side of the knife plate at a location on the knife plate between the first and second pivot attachment locations a distance of between 0.75 inches and 2 inches and at an angle of between 80-110 degrees, as measured from a line drawn parallel to the side of the knife plate from which the knife extends outward, wherein, in operation, the knife is configured to either: (a) move upward to cut respective clipped packages or (b) move downward to cut respective clipped packages; and
   wherein only the portion of the knife extending outward of the side of knife plate cuts through the respective clipped packages.

2. The clipper assembly of claim 1, wherein the knife plate has a polygonal shape with between 3-6 sides, typically five sides, and wherein the knife plate shape has a longest side as a bottom side, and wherein the second portion that is pivotably attached to the clipper body is a distance of between about 3 inches to about 3.5 inches from a tip of the knife in a full cut position.

3. The clipper assembly of claim 1, wherein the knife is detachably held by the knife plate to extend laterally from the knife plate, and wherein the first portion of the body of the knife plate comprises a first aperture holding a first pin for pivotable attachment to the rod, wherein the second portion of the body of the knife plate comprises a second aperture holding a second pin attached to a die support of the clipper body for the pivotable attachment to the clipper body, and wherein the first and second apertures are laterally spaced apart between 4-6 inches, center to center.

4. The clipper assembly of claim 1, wherein the knife is configured to operate per (b) and has a tip and a cutting surface, and wherein the cutting surface faces downward, wherein the rod of the knife cylinder has a first extended position when the knife is in an upper first position associated with a pre-cut and/or home position, and wherein the rod of the knife cylinder has a second retracted position when the knife is in a cut or post-cut position so that the knife is configured to cut with a downward movement as it moves from the pre-cut position to the cut or post-cut position.

5. The clipper assembly of claim 1, wherein the knife extends from the knife plate at an angle of between 90-100 degrees, measured from a line drawn parallel to the side from which the knife extends outward from.

6. The clipper assembly of claim 1, wherein the knife has a maximum cutting length of between 0.5 and 0.75 inches.

7. The clipper assembly system of claim 1, wherein the knife is configured to move per (b), and wherein the knife cylinder, rod, knife plate and knife cooperate to position the knife at an angle from horizontal that is greater in a home/pre-cut position than the angle from horizontal in a full cut, downward position.

8. The clipper assembly of claim 7, wherein the angle from horizontal in the home/pre-cut position is between 60 and 50 degrees, and wherein the angle from horizontal in the full cut, downward position is between 30 and 40 degrees.

9. The clipper assembly of claim 1, wherein the knife is configured to operate per (a) and has a tip and a cutting surface, and wherein the cutting surface faces upward, wherein the rod of the knife cylinder has a first retracted position when the knife is in a lower pre-cut position under the clip die, and wherein the rod of the knife cylinder has a second extended position when the knife is in a cut or post-cut position so that the knife is configured to cut with an upward movement as it moves from the pre-cut position to the cut or post-cut position.

10. The clipper assembly of claim 1, wherein the knife plate has a polygonal shape with five sides, and wherein the knife plate shape has a longest side as a bottom side, and wherein the second portion that is pivotably attached to a die support of the clipper body and resides a distance of between about 3.20 and 3.30 inches from a tip of the knife in the full cut position.

11. The clipper assembly of claim 1, wherein the knife plate shape has a longest side as a bottom side, and wherein the second portion that is pivotably attached to the clipper body is a distance of between about 3 inches to about 3.5 inches from a tip of the knife in a full cut position, and wherein the knife has a tip and a cutting surface, and wherein the cutting surface faces downward.

12. The clipper assembly of claim 1, wherein the second portion that is pivotably attached to the clipper body is a distance of between 3 inches to 3.5 inches from a tip of the knife in a full cut position.

13. The clipper assembly of claim 1, wherein the knife is detachably held by the knife plate, and wherein the first portion of the body of the knife plate comprises a first aperture holding a first pin for pivotable attachment to the rod, wherein the second portion of the body of the knife plate comprises a second aperture holding a second pin attached to the clipper body for the pivotable attachment to the clipper body, wherein the knife has a tip and a cutting surface, and wherein the cutting surface faces downward.

14. The clipper assembly of claim 1, wherein the rod of the knife cylinder has a first extended position when the knife is in an upper first position associated with a pre-cut and/or home position, and wherein the rod of the knife cylinder has a second retracted position when the knife is in a cut and/or post-cut position so that the knife is configured to cut with a downward movement as it moves from the pre-cut position to the cut or post-cut position.

15. The clipper assembly of claim 1, wherein the knife cylinder, rod, knife plate and knife cooperate to position the knife at an angle from horizontal that is greater in a home/pre cut position than the angle from horizontal in a full cut, downward position.

16. The clipper assembly of claim 15, wherein the angle from horizontal in the home/pre-cut position is between 60 and 50 degrees, and wherein the angle from horizontal in the full cut, downward position is between 30 and 40 degrees.

17. The clipper assembly of claim 1, wherein the clipper body is held by a rotating table having an upper horizontally oriented table top, with the knife cylinder and knife held under the table top.

18. A clipper assembly, comprising:
a clipper body holding at least one clip die;
a knife cylinder with a downwardly extending rod, the knife cylinder attached to the clipper body above the clip die;
a knife plate having a body with a perimeter, wherein a first portion of the body of the knife plate is pivotably attached to the rod and a second portion of the body of the knife plate is pivotably attached to the clipper body below the clip die; and
a longitudinal knife held by the knife plate, wherein the knife extends outward laterally from a side of the knife plate at a location on the knife plate between the location where the rod is pivotally attached to the knife plate body and the location where the clipper body is pivotally attached to the knife plate body, and at an angle of between 80-110 degrees, as measured from a line drawn parallel to the side of the knife plate from which the knife extends outward, the knife defining a cutting edge extending along the longitudinal knife,
wherein the knife cylinder operating to pivot the knife plate about the clipper body to sweep the cutting edge of the knife through a cutting path, either: (a) upward to cut respective clipped packages or (b) downward to cut respective clipped packages; and
wherein the knife plate remains out of the cutting path and only the portion of the knife extending outward of the side of knife plate cuts through the respective clipped packages.

19. The clipper assembly of claim 18, wherein the knife plate has a polygonal shape with between 3-6 sides, typically five sides, and wherein the knife plate shape has a longest side as a bottom side, and wherein the second portion that is pivotably attached to the clipper body is a distance of between about 3 inches to about 3.5 inches from a tip of the knife in a full cut position.

20. The clipper assembly of claim 18, wherein the knife is detachably held by the knife plate to extend laterally from the knife plate, and wherein the first portion of the body of the knife plate comprises a first aperture holding a first pin for pivotable attachment to the rod, wherein the second portion of the body of the knife plate comprises a second aperture holding a second pin attached to a die support of the clipper body for the pivotable attachment to the clipper body, and wherein the first and second apertures are laterally spaced apart between 4-6 inches, center to center.

21. The clipper assembly of claim 18, wherein the first portion of the body of the knife plate comprises a first aperture holding a first pin for pivotable attachment to the rod, wherein the second portion of the body of the knife plate comprises a second aperture holding a second pin attached to a die support of the clipper body for the pivotable attachment to the clipper body, and wherein the first and second apertures are laterally spaced apart between 4-6 inches, center to center.

22. The clipper assembly of claim 18, wherein the knife is configured to operate per (b) and has a tip and a cutting surface, and wherein the cutting surface faces downward, wherein the rod of the knife cylinder has a first extended position when the knife is in an upper first position associated with a pre-cut and/or home position, and wherein the rod of the knife cylinder has a second retracted position when the knife is in a cut or post-cut position so that the knife is configured to cut with a downward movement as it moves from the pre-cut position to the cut or post-cut position.

23. The clipper assembly of claim 18, wherein the knife extends from the knife plate at an angle of between 90-100 degrees, measured from a line drawn parallel to the side from which the knife extends outward from.

24. The clipper assembly system of claim 18, wherein the knife is configured to move per (b), and wherein the knife cylinder, rod, knife plate and knife cooperate to position the knife at an angle from horizontal that is greater in a home/pre-cut position than the angle from horizontal in a full cut, downward position.

25. The clipper assembly of claim 24, wherein the angle from horizontal in the home/pre-cut position is between 60 and 50 degrees, and wherein the angle from horizontal in the full cut, downward position is between 30 and 40 degrees.

26. The clipper assembly of claim 18, wherein the knife is configured to operate per (a) and has a tip and a cutting surface, and wherein the cutting surface faces upward, wherein the rod of the knife cylinder has a first retracted position when the knife is in a lower pre-cut position under the clip die, and wherein the rod of the knife cylinder has a second extended position when the knife is in a cut or post-cut position so that the knife is configured to cut with an upward movement as it moves from the pre-cut position to the cut or post-cut position.

27. The clipper assembly of claim 18, wherein the knife plate has a polygonal shape with five sides, and wherein the knife plate shape has a longest side as a bottom side, and wherein the second portion that is pivotably attached to a die support of the clipper body and resides a distance of between about 3.20 and 3.30 inches from a tip of the knife in the full cut position.

28. The clipper assembly of claim 18, wherein the knife plate shape has a longest side as a bottom side, and wherein the second portion that is pivotably attached to the clipper body is a distance of between about 3 inches to about 3.5 inches from a tip of the knife in a full cut position, and wherein the knife has a tip and a cutting surface, and wherein the cutting surface faces downward.

29. The clipper assembly of claim 18, wherein the knife is detachably held by the knife plate, and wherein the first portion of the body of the knife plate comprises a first aperture holding a first pin for pivotable attachment to the rod, wherein the second portion of the body of the knife plate comprises a second aperture holding a second pin attached to the clipper body for the pivotable attachment to the clipper body, wherein the knife has a tip and a cutting surface, and wherein the cutting surface faces downward.

\* \* \* \* \*